(12) United States Patent  (10) Patent No.: US 9,197,831 B2
Kobayashi et al.  (45) Date of Patent: Nov. 24, 2015

(54) PHOTOELECTRIC CONVERSION SYSTEM

(71) Applicant: CANON KABUSHIKI KAISHA, Tokyo (JP)

(72) Inventors: Daisuke Kobayashi, Kawaguchi (JP); Yukio Araoka, Hiratsuka (JP); Yuichi Naito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/321,561

(22) Filed: Jul. 1, 2014

(65) Prior Publication Data

US 2015/0009374 A1 Jan. 8, 2015

(30) Foreign Application Priority Data

Jul. 5, 2013 (JP) ................. 2013-141205

(51) Int. Cl.
  *H04N 3/14* (2006.01)
  *H04N 5/335* (2011.01)
  *H04N 9/09* (2006.01)
  *H04N 5/374* (2011.01)
  *H04N 5/378* (2011.01)

(52) U.S. Cl.
  CPC .............. *H04N 5/3742* (2013.01); *H04N 5/378* (2013.01)

(58) Field of Classification Search
  CPC ....... H04N 5/369; H04N 5/335; H04N 5/341; H04N 5/345; H04N 5/3452; H04N 5/3765; H04N 3/155; H04N 5/374; H04N 3/1506; H04N 3/1512; H04N 5/3745; H01L 27/146
  USPC .................. 348/294–324, 262–265
  See application file for complete search history.

(56) References Cited

U.S. PATENT DOCUMENTS

| | | | | |
|---|---|---|---|---|
| 4,672,430 A | * | 6/1987 | Asaida | 348/253 |
| 4,835,594 A | * | 5/1989 | Kihara | 348/263 |
| 5,255,081 A | * | 10/1993 | Miyamoto et al. | 348/234 |
| 5,966,170 A | * | 10/1999 | Sugiura et al. | 348/234 |
| 6,611,289 B1 | * | 8/2003 | Yu et al. | 348/265 |
| 2003/0035056 A1 | * | 2/2003 | Chen et al. | 348/273 |
| 2005/0242849 A1 | * | 11/2005 | Muramatsu et al. | 327/151 |
| 2005/0285955 A1 | * | 12/2005 | Utz et al. | 348/265 |
| 2006/0146267 A1 | * | 7/2006 | Choi et al. | 349/156 |
| 2006/0186315 A1 | * | 8/2006 | Lee et al. | 250/208.1 |
| 2006/0214086 A1 | * | 9/2006 | Fukushima | 250/208.1 |
| 2010/0053058 A1 | * | 3/2010 | Nagashima et al. | 345/98 |
| 2010/0276572 A1 | * | 11/2010 | Iwabuchi et al. | 250/208.1 |
| 2010/0315539 A1 | * | 12/2010 | Azuma et al. | 348/265 |
| 2011/0148835 A1 | * | 6/2011 | Yamazaki | 345/207 |
| 2011/0180692 A1 | * | 7/2011 | Matsuda et al. | 250/214 A |
| 2012/0248293 A1 | * | 10/2012 | Yamazaki et al. | 250/208.1 |
| 2012/0287102 A1 | * | 11/2012 | Toyomura et al. | 345/211 |
| 2012/0314109 A1 | * | 12/2012 | Murakami et al. | 348/300 |
| 2013/0088292 A1 | * | 4/2013 | Maehashi et al. | 330/124 R |
| 2013/0153749 A1 | * | 6/2013 | Sakurai | 250/208.1 |
| 2014/0022401 A1 | * | 1/2014 | Awatani | 348/207.11 |

FOREIGN PATENT DOCUMENTS

JP   10-150600 A   6/1998

* cited by examiner

*Primary Examiner* — Chia-Wei A Chen
(74) *Attorney, Agent, or Firm* — Canon USA, Inc. IP Division

(57) ABSTRACT

A photoelectric conversion system is configured to correct a difference in offset component of signals to be outputted per photoelectric conversion device.

32 Claims, 14 Drawing Sheets

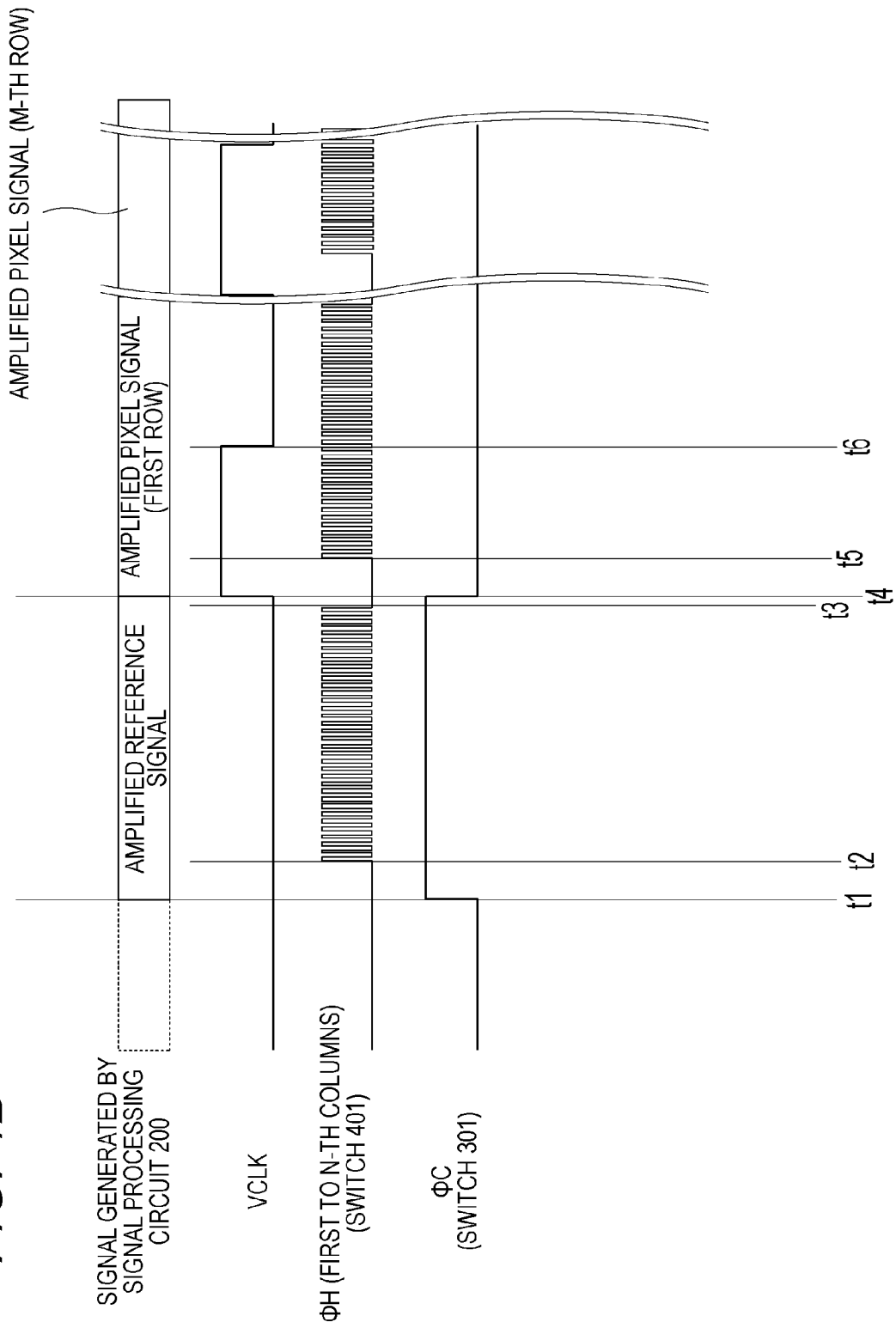

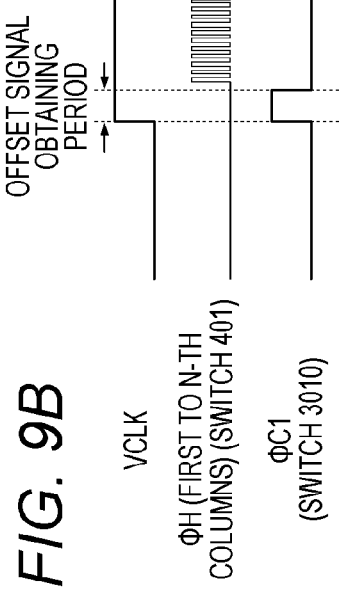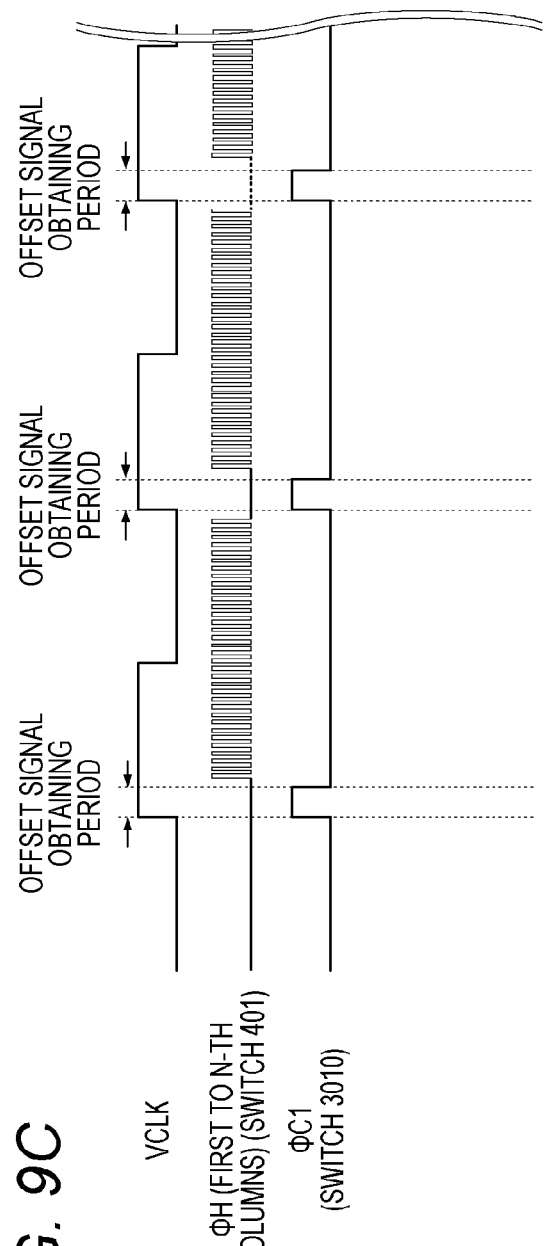

PHOTOELECTRIC CONVERSION SYSTEM

BACKGROUND OF THE INVENTION

1. Field of the Invention

The present disclosure relates to a photoelectric conversion system having pixels for generating signals from incident light through photoelectric conversion.

2. Description of the Related Art

There has been known a photoelectric conversion device having pixels for generating signals from incident light through photoelectric conversion. An exemplary photoelectric conversion device is disclosed in Japanese Patent Application Laid-Open No. 10-150600.

Japanese Patent Application Laid-Open No. 10-150600 describes a photoelectric conversion device having pixels for outputting signals based on incident light and signals at a reset level. Japanese Patent Application Laid-Open No. 10-150600 also describes a photoelectric conversion device configured to supply a common fixed voltage to a plurality of signal readout paths in order to reduce noise caused by difference in offset component among the signal readout paths.

SUMMARY OF THE INVENTION

One aspect relates to a photoelectric conversion system, including: a plurality of photoelectric conversion devices; and a data processing circuit configured to receive signals to be outputted from the photoelectric conversion devices. The photoelectric conversion devices are arranged on different semiconductor substrates. The photoelectric conversion devices each includes: a pixel output circuit configured to output a first and second pixel signals having different in signal value; a signal generation circuit configured to generate a reference signal and to receive the first and second pixel signals; a signal processing circuit configured to process the pixel signal; a plurality of output circuits; a first transfer line; and a second transfer line. The signal processing circuit is electrically connected through the first transfer line to an input node of a first output circuit of the output circuits. The signal processing circuit is further electrically connected through the second transfer line to an input node of a second output circuit of the output circuits. The input node of the first output circuit and the input node of the second output circuit are configured to receive a common signal based on the reference signal.

Another aspect relates to a photoelectric conversion system, including: a plurality of photoelectric conversion devices; and a data processing circuit configured to receive signals to be outputted from the photoelectric conversion devices. The photoelectric conversion devices are arranged on different semiconductor substrates. The photoelectric conversion devices each includes: a plurality of pixel output circuits each configured to output a pixel signal; a signal generation circuit configured to generate a reference signal; a plurality of signal processing circuits each configured to process the pixel signal; and a plurality of output circuits. The pixel output circuits are arranged in a plurality of columns. The signal processing circuits are each arranged correspondingly to the columns of pixel output circuits. A first signal processing circuit is one of the plurality of signal processing circuits, and is configured to input a signal based on the pixel signal to an input node of a first output circuit of the output circuits. A second signal processing circuit is the other one of the plurality of signal processing circuits, and is configured to input a signal based on the pixel signal to an input node of a second output circuit of the output circuits. The input node of the first output circuit and the input node of the second output circuit are configured to receive a common signal based on the reference signal.

Still another aspect relates to a photoelectric conversion system, including: a plurality of photoelectric conversion devices; and a data processing circuit configured to receive signals to be outputted from the photoelectric conversion devices. The photoelectric conversion devices are arranged on different semiconductor substrates. The photoelectric conversion devices each includes: a plurality of pixel output circuits each configured to output a pixel signal; a plurality of signal processing circuits each having an input node configured to receive the pixel signal, the signal processing circuits each being configured to process the pixel signal; and a signal generation circuit configured to generate a reference signal. The input node of each of the signal processing circuits is configured to receive a common signal based on the reference signal.

Further features of the present invention will become apparent from the following description of exemplary embodiments (with reference to the attached drawings).

BRIEF DESCRIPTION OF THE DRAWINGS

FIG. 4B is an exemplary operation diagram of a photoelectric conversion device.

FIG. 7B is an exemplary operation diagram of the photoelectric conversion device.

FIG. 9B is an exemplary operation diagram of the photoelectric conversion device.

FIG. 9C is an exemplary operation diagram of the photoelectric conversion device.

DESCRIPTION OF THE EMBODIMENTS

In the photoelectric conversion device described in Japanese Patent Application Laid-Open No. 10-150600, consideration is not given to correction of difference in offset component in signals to be outputted per photoelectric conversion device in a photoelectric conversion system having a plurality of photoelectric conversion devices.

In the technique to be described hereinafter, consideration is given to correction of difference in offset component in signals to be outputted per photoelectric conversion device.

Photoelectric conversion devices and photoelectric conversion systems according to embodiments are described below with reference to the drawings.

First Embodiment

Figure 1A:
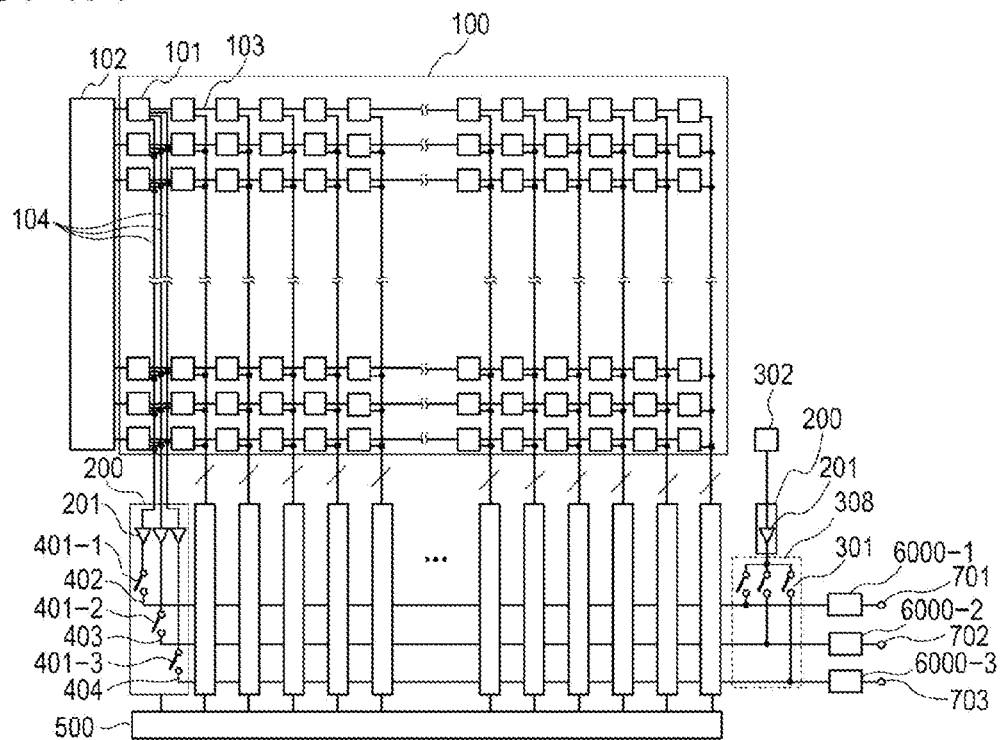
FIG. 1A is an exemplary configuration diagram of a photoelectric conversion device.

FIG. 1A depicts a photoelectric conversion device according to a first embodiment.

A pixel array 100 of FIG. 1A is a block of pixel output circuits 101 arrayed in M rows×N columns. The pixel output circuits 101 each has a photoelectric converter for generating charge from incident light by photoelectric conversion. A pixel control circuit 102 controls photoelectric conversion operation and readout operation of the pixel output circuits 101. A control signal line 103 transmits control signals outputted from the pixel control circuit 102 to the pixel output circuits 101. The control signal line 103 is depicted as a single signal line in FIG. 1A but is actually a plurality of control lines. The pixel output circuits 101 in a row that is chosen by the pixel control circuit 102 input pixel signals into pixel output lines 104 that are collectively provided per column of pixel output circuits 101. It is to be noted that with respect to a signal generation circuit 302, output and non-output of reference signals are controlled by a timing generator (not shown.) The pixel output lines 104 are signal lines for transmitting pixel signals to be outputted from the pixel output circuits 101. In the photoelectric conversion device of FIG. 1A, one column of signal processing circuit 200 is provided per column of pixel output lines 104.

Each column of pixel output lines 104 has three signal lines. The three signal lines transmit to a signal processing circuit 200 signals at a reset level, first amplified signals that are pixel signals amplified by a first amplification factor, and second amplified signals that are pixel signals amplified by a second amplification factor, which are outputted from the pixel output circuits 101, respectively. The pixel output lines 104 in other columns each has three signal lines as well.

Input nodes of the signal processing circuits 200 are connected to the pixel output lines 104. The signal processing circuits 200 are configured to process pixel signals to be inputted through the pixel output lines 104. The signal processing circuits 200 of the present embodiment generate and retain amplified signals of the signal at the reset level, amplified signals of the first amplified signals, and amplified signals of the second amplified signals.

Amplifier circuits 201 of the signal processing circuits 200 generate signals by performing amplification on the signals at the reset level, the first amplified signals, and the second amplified signals, which are inputted from the pixel output circuits 101. A horizontal selection circuit 500 turns on switches 401-1, 401-2, and 401-3 of each signal processing circuit 200 simultaneously. This causes each signal processing circuit 200 to sequentially input amplified pixel signals to an output circuit 6000-1 through a transfer line 402. A transfer line 403 transfers amplified signals of the first amplified signals to an output circuit 6000-2. A transfer line 404 transfers amplified signals of the second amplified signals to an output circuit 6000-3.

The photoelectric conversion device has the signal generation circuit 302 for generating reference signals. The reference signals generated by the signal generation circuit 302 are amplified by the signal processing circuits 200. The reference signal thus amplified is referred to as the amplified reference signal. The amplified reference signal based on the reference signal is inputted to a node that is short-circuited between the input nodes of the parallelly arranged output circuits 6000-1, 6000-2, and 6000-3 by a switch group 308 comprising switches 301. The amplified reference signals are signals based on the reference signals.

Figure 1B:
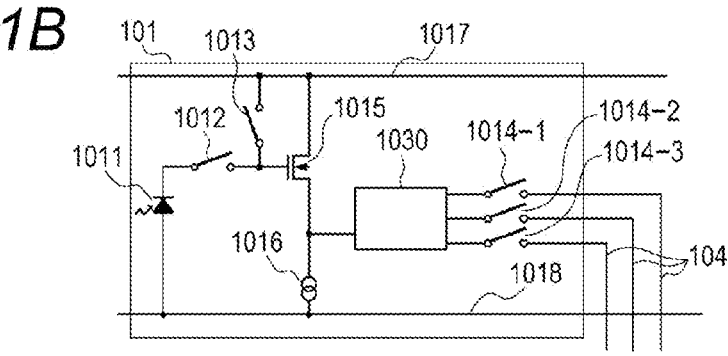
FIG. 1B is an exemplary configuration diagram of a pixel output circuit.

FIG. 1B is a configuration example of the pixel output circuit 101 of the present embodiment and includes a photoelectric converter 1011, switches 1012, 1013, 1014-1, 1014-2, and 1014-3, a transistor 1015, a current source 1016, and a pixel amplifier 1030. Drive power is introduced through a power source line 1017 and a ground line 1018. The pixel control circuit 102 controls electrical continuity and non-continuity of each of the switches 1012, 1013, 1014-1, 1014-2, and 1014-3. The switch 1012 may be a transistor which performs completely-depleted transfer of electric charge generated by the photoelectric conversion unit 1011 to an input node of the transistor 1015. A source follower circuit of the pixel output circuit 101 comprises the transistor 1015, the power source line 1017, and the current source 1016.

The pixel control circuit 102 turns on the switches 1012 and 1013 to perform reset to a potential based on the potential of the power source line 1017 by inputting a reset potential to the input nodes of the photoelectric converter 1011 and the transistor 1015. A first primary node of the transistor 1015 receives a power source voltage through the power source line 1017. A second primary node of the transistor 1015 is electrically connected with the switches 1014 and with the current source 1016.

The pixel control circuit 102 turns off the switches 1012 and 1013 to cancel the reset on the potential of the input nodes of the photoelectric converter 1011 and the transistor 1015. The signals at the reset level are signals to be outputted from the transistor 1015 based on the potential of the input node of the transistor 1015 with the reset potential being inputted. The signals at the reset level are inputted from the pixel amplifier 1030 into a pixel output line 104 when the pixel control circuit 102 turns on the switch 1014-1.

The photoelectric converter 1011 performs photoelectric conversion, i.e., generation of charge based on incident light. The pixel control circuit 102 then turns on the switch 1012 to transfer the charge generated at the photoelectric converter 1011 to the input node of the transistor 1015. The transistor 1015 inputs signals based on the charge that has been given to the input node thereof to the pixel amplifier 1030. The pixel amplifier 1030 generates the first amplified signals and the second amplified signals based on the inputted signals.

When the pixel control circuit 102 turns on the switch 1014-2, the first amplified signals are inputted into a pixel output line 104. When the pixel control circuit 102 turns on the switch 1014-3, the second amplified signals are inputted into a pixel output line 104.

Figure 1C:
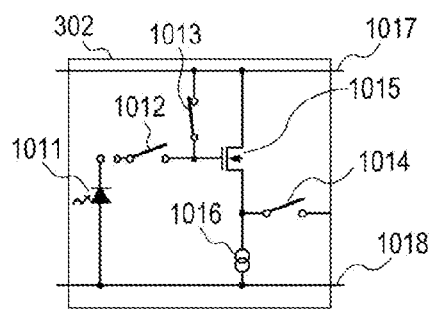
FIG. 1C is an exemplary configuration diagram of a signal generation circuit.

FIG. 1C is a configuration example of the signal generation circuit 302 of the present embodiment. While the constituent components are the same as those of the pixel output circuit 101 of FIG. 1B, the photoelectric converter 1011 and the switch 1012 are not electrically connected, and the switch 1013 is constantly on. The reference signals to be outputted from the signal generation circuit 302 are signals based on the potential of the input node of the transistor 1015 with the reset potential being inputted. The reference signals to be outputted from the transistor 1015 of the signal generation circuit 302 may be regarded as signals corresponding to the signals at the reset level to be outputted from the transistor 1015 of the pixel output circuit 101. Thus, the signal value of the amplified reference signals to be generated by the signal processing circuits 200 corresponds to the signal value of the signals that are produced by amplification of the signals at the reset level to be outputted from the transistor 1015, which amplification has been performed by the signal processing circuits 200. The switch 1014 of the signal generation circuit 302 is controlled by the timing generator. The power source line 1017 and the ground line 1018 of the signal generation circuit 302 are shared with the pixel output circuit 101. For example, a first primary node of the transistor 1015 receives a power source voltage through the power source line 1017. A second primary node of the transistor 1015 is electrically connected with the switch 1014 and with the current source 1016.

It is to be noted that the signal generation circuit 302 is to have the transistor 1015 for outputting the signals at the reset level and may be configured not to have the photoelectric converter 1011. A source follower circuit of the signal generation circuit 302 includes the transistor 1015, the power source line 1017, and the current source 1016. The transistor 1015 of the signal generation circuit 302 is made by the same manufacturing process for the transistor 1015 of the pixel output circuit 101. The respective transistors 1015 of the pixel output circuit 101 and the signal generation circuit 302 have substantially the same in W/L, i.e., the ratio of gate width W to gate length L. The value of W/L of the transistor 1015 of the signal generation circuit 302 with respect to the value of W/L of the transistor 1015 of the pixel output circuit 101 may fall within the range of not smaller than 0.95 times and not larger than 1.05 times. The source follower circuit including the transistor 1015 of the pixel output circuit 101 is a first amplifier of the pixel output circuit 101. The source follower circuit including the transistor 1015 of the signal generation circuit 302 is a second amplifier of the signal generation circuit 302.

Figure 2A:
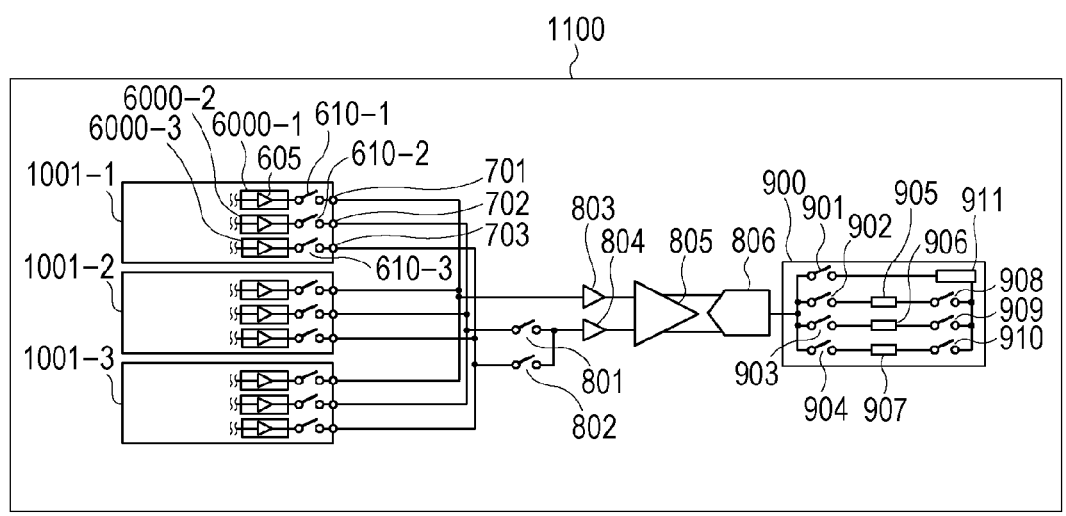
FIG. 2A is an exemplary configuration diagram of a photoelectric conversion system.

FIG. 2A depicts a photoelectric conversion system of the present embodiment. In FIG. 2A, the members having the same functions as those depicted in FIGS. 1A to 1C are denoted by the same reference numerals as used in FIGS. 1A to 1C.

A photoelectric conversion system 1100 of FIG. 2A has a plurality of photoelectric conversion devices 1001-1, 1001-2, and 1001-3. The photoelectric conversion devices 1001-1, 1001-2, and 1001-3 are provided on different semiconductor substrates. The photoelectric conversion devices 1001-1, 1001-2, and 1001-3 have the same configuration as that of the photoelectric conversion device depicted in FIG. 1A except the configuration of the output circuit 600. Output circuits 6000-1, 6000-2, and 6000-3 have buffer circuits 605. FIG. 2A depicts, among the constituent components of the photoelectric conversion devices, the output circuits 6000-1, 6000-2, and 6000-3, the buffer circuits 605, switches 610-1, 610-2, and 610-3, and output nodes 701, 702, and 703, and redundant description as that for the photoelectric conversion device of FIG. 1A is not given.

In the photoelectric conversion system 1100 of FIG. 2A, buffer circuits 803 and 804, a differential amplifier 805, an analog/digital converter (A/D converter) 806, and a data processing circuit 900 are shared among the photoelectric conversion devices 1001-1, 1001-2, and 1001-3. The data processing circuit 900 has switches 901, 902, 903, 904, 908, 909, and 910, memories 905, 906, and 907, and a data composition circuit 911.

A controller (not shown) of the photoelectric conversion system 1100 turns on the switches 610-1, 610-2, and 610-3 of the photoelectric conversion device 1001-1 of the photoelectric conversion devices 1001-1, 1001-2, and 1001-3. This causes the output circuit 6000-1 of the photoelectric conversion device 1001-1 to input amplified signals of the signals at the reset level (hereinafter referred to as "N signals") to the buffer circuit 803. The output circuit 6000-2 of the photoelectric conversion device 1001-1 inputs amplified signals of the first amplified signals (hereinafter referred to as "S1 signals") to a switch 801. The output circuit 6000-3 of the photoelectric conversion device 1001-1 inputs amplified signals of the second amplified signals (hereinafter referred to as "S2 signals") to a switch 802. When the controller turns on the switch 801, the S1 signals are inputted to the buffer circuit 804. When the controller turns on the switch 802, the S2 signals are inputted to the buffer circuit 804. The differential amplifier 805 inputs amplified signals of difference between the signals outputted from the buffer circuit 803 and the signals outputted from the buffer circuit 804 to the A/D converter 806.

The A/D converter 806 outputs results of A/D conversion to the data processing circuit 900. At the data processing circuit 900, image data is created.

Figure 2B:
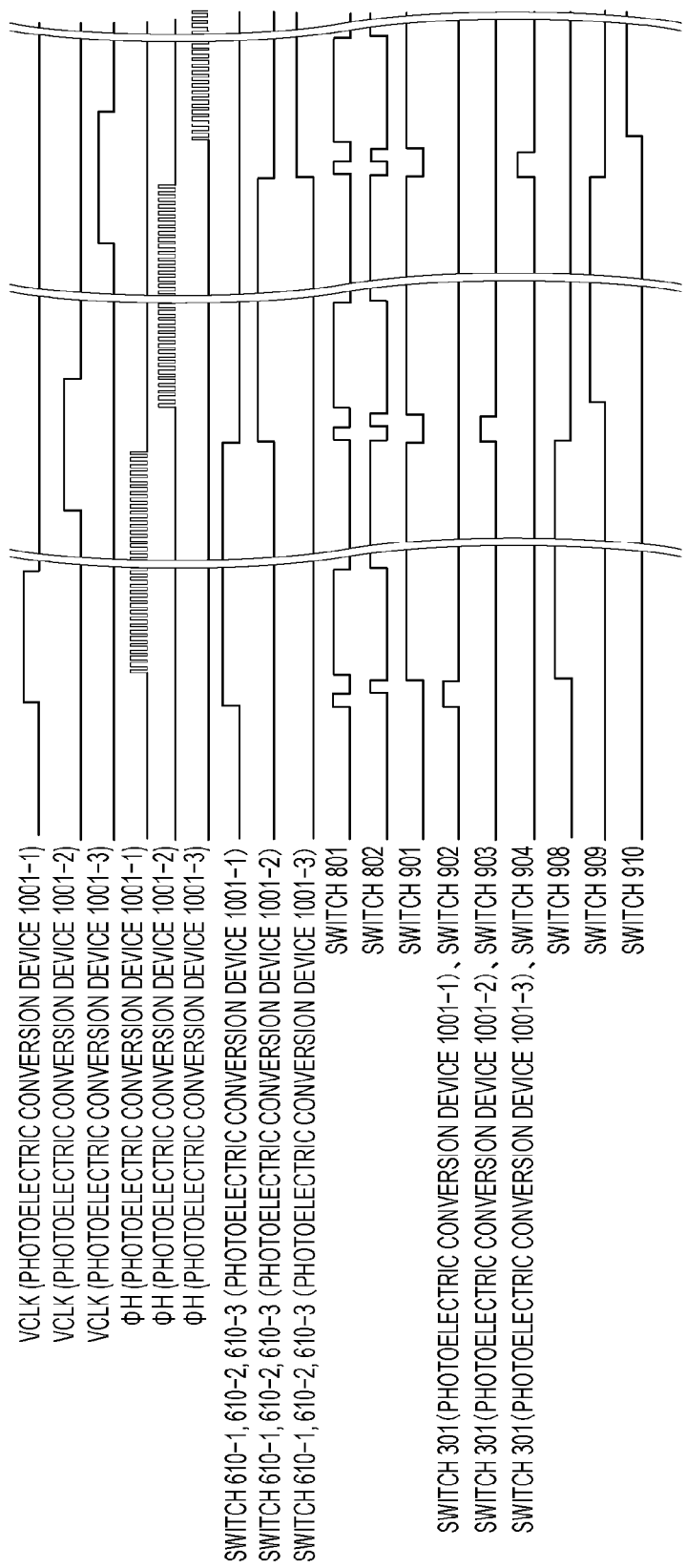
FIG. 2B is an exemplary operation diagram of the photoelectric conversion system.

FIG. 2B is a timing diagram representing the operation of the photoelectric conversion system 1100 depicted in FIG. 2A.

It is to be noted in the present description that the switches are turned on when control signals to be inputted therein are at High level (hereinafter referred to as "H level") and are turned off when the control signals are at Low level (hereinafter referred to as "L level.")

Signals VCLK depicted in FIG. 2B are instruction signals to be inputted from a timing generator (not shown) provided in the photoelectric conversion device to the pixel control circuit 102. When a signal VCLK has its level changed from L level to H level, the pixel control circuit 102 selects a row of pixel output circuits 101. This causes the pixel output circuits 101 in each row to sequentially input pixel signals into the pixel output lines 104.

Control signals φH are adapted for the horizontal selection circuit 500 to sequentially control each switch 401 from a first to N-th columns. It is to be noted that the signal processing circuit 200 in the first column described herein refers to the signal processing circuit 200 that is located the most proximate to the pixel control circuit 102 among the signal processing circuits 200 depicted in FIG. 1A.

Control signals φC are inputted by the timing generator to the switches 301 to control the switches 301.

Description is given of the operation of the photoelectric conversion device 1001-1 in a case where the switches 610-1, 610-2, and 610-3 are on. The controller of the photoelectric conversion device 1001-1 turns on the switches 610-1, 610-2, and 610-3 during a period in which the timing generator keeps the switches 301 on. This causes the output circuits 6000-1, 6000-2, and 6000-3 of the photoelectric conversion device 1001-1 to input amplified reference signals to the output nodes 701, 702, and 703, respectively. The controller turns on the switch 902 during a period in which the switches 301 of the photoelectric conversion device 1001-1 are on. Then, the controller turns on the switch 801 during a period in which the controller keeps the switch 902 on. This causes the differential amplifier 805 to input to the A/D converter 806 signals based on difference between the amplified reference signals to be outputted from the output circuit 6000-1 and the amplified reference signals to be outputted from the output circuit 6000-2. The A/D converter 806 converts to digital signals the signals based on the difference between the amplified reference signals to be outputted from the output circuit 6000-1 and the amplified reference signals to be outputted from the output circuit 6000-2. The digital signals are referred to as "digital A signals." The memory 905 retains the digital A signals to be inputted from the A/D converter 806.

Next, the controller turns off the switch 801 and then turns on the switch 802. This causes the differential amplifier 805 to input to the A/D converter 806 signals based on difference between the amplified reference signals to be outputted from the output circuit 6000-1 and the amplified reference signals to be outputted from the output circuit 6000-3. The A/D converter 806 converts to digital signals the signals based on the difference between the amplified reference signals to be outputted from the output circuit 6000-1 and the amplified reference signals to be outputted from the output circuit 6000-3. The digital signals are referred to as "digital B signals." The memory 905 retaining the digital A signals further retains the digital B signals to be inputted from the A/D converter 806.

The controller turns off the switches 802 and 902. The horizontal selection circuit 500 of the photoelectric conversion device 1001-1 turns off the switches 301. The controller then turns on the switch 901. Subsequently, the timing generator of the photoelectric conversion device 1001-1 sequentially turns the control signals φH to H level. This causes the output circuits 6000-1, 6000-2, and 6000-3 to input the N signals, the S1 signals, and the S2 signals to the output nodes 701, 702, and 703, respectively.

The controller turns on the switch 801. This causes the differential amplifier 805 to input signals based on difference between the N signals and the S1 signals to the A/D converter 806. The A/D converter 806 converts the signals based on the difference between the N signals and the S1 signals to digital signals. The digital signals are referred to as "digital C signals." The A/D converter 806 inputs the digital C signals to the data composition circuit 911. The controller has turned on the switch 908. This causes the memory 905 to input the digital A signals to the data composition circuit 911. The data composition circuit 911 generates signals based on difference between the digital C signals and the digital A signals and also generates first image data based on these differential signals.

Next, the controller turns off the switch 801 and then turns on the switch 802. This causes the differential amplifier 805 to input signals based on difference between the N signals and the S2 signals to the A/D converter 806. The A/D converter 806 converts the signals based on the difference between the N signals and the S2 signals to digital signals. The digital signals are referred to as "digital D signals." The A/D converter 806 inputs the digital D signals to the data composition circuit 911. The controller has turned on the switch 908. This causes the memory 905 to input the digital B signals to the data composition circuit 911. The data composition circuit 911 generates signals based on difference between the digital D signals and the digital B signals and also generates second image data based on these differential signals. The data composition circuit is an operation circuit to generate signals of difference between the signals retained by the memory 905 and signals based on pixel signals.

In this manner, the data composition circuit 911 generates the first image data and the second image data by using the signals to be outputted from the photoelectric conversion device 1001-1.

The digital A signals are based on difference in offset component between the electrical path from the transfer line 402 to the A/D converter 806 and the electrical path from the transfer line 403 to the A/D converter 806. The signals based on the difference in offset component are also contained in the digital C signals. The data composition circuit 911 subtracts the digital A signals from the digital C signals. This enables the data composition circuit 911 to generate first image data with reduced influence of the difference in offset component between the electrical path from the transfer line 402 to the A/D converter 806 and the electrical path from the transfer line 403 to the A/D converter 806.

The digital B signals are based on difference in offset component between the electrical path from the transfer line 402 to the A/D converter 806 and the electrical path from the transfer line 404 to the A/D converter 806. The signals based on the difference in offset component are also contained in the digital D signals. The data composition circuit 911 subtracts the digital B signals from the digital D signals. This enables the data composition circuit 911 to generate second image data with reduced influence of the difference in offset component between the electrical path from the transfer line 402 to the A/D converter 806 and the electrical path from the transfer line 404 to the A/D converter 806.

The signals to be outputted from the photoelectric conversion device 1001-1 have been described so far. The photoelectric conversion device 1001-2 operates in the same manner as the photoelectric conversion device 1001-1 except that the digital A signals and the digital B signals are retained by the memory 906 instead of the memory 905. The photoelectric conversion device 1001-3 also operates in the same manner as the photoelectric conversion device 1001-1 except that the digital A signals and the digital B signals are retained by the memory 907 instead of the memory 905.

The photoelectric conversion system 1100 of the present embodiment has constituent components that are arranged in parallel, such as the photoelectric conversion devices 1001-1, 1001-2, and 1001-3, the output circuits 6000-1, 6000-2, and 6000-3 included in each photoelectric conversion device, the buffer circuits 803 and 804, and the transfer lines for transmitting signals. Difference in offset component emanates to signals to be outputted from the photoelectric conversion devices 1001 due to, for example, variations in property among the constituent components arranged in parallel, manufacturing irregularities among the photoelectric conversion devices 1001, temperature difference among the photoelectric conversion devices 1001, and potential difference of the power source voltages. The difference in offset component leads to level difference in luminance in images that are generated by using image data from the plurality of photoelectric conversion devices 1001, causing degradation in image quality.

The photoelectric conversion system 1100 of the present embodiment generates signals of difference between the digital C signals and the digital A signals and of difference between the digital D signals and the digital B signals of each photoelectric conversion device 1001. This allows for reduction of difference in offset component in signals to be outputted from the plurality of photoelectric conversion devices 1001, which difference is caused by, for example, variations in property among the constituent components arranged in parallel, manufacturing irregularities among the photoelectric conversion devices 1001, temperature difference among the photoelectric conversion devices 1001, and potential difference of the power source voltages. Thus, images generated by using image data from the plurality of photoelectric conversion devices 1001 are less likely to have level difference in luminance.

The photoelectric conversion devices of the present embodiment use reference signals of a signal value corresponding to the signals at the reset level to be outputted from the pixel output circuits 101. In images capturing a subject at lower luminance, influence of difference in offset component per photoelectric conversion device 1001 tends to stand out as compared to a case in which a subject at higher luminance is captured. For this reason, difference in offset component per photoelectric conversion device 1001, which tends to stand out when a subject at lower luminance is captured, is reduced by using the amplified reference signals based on the reference signals of the signal value corresponding to the signals at the reset level that have a smaller signal amplitude.

The signal generation circuit 302 has a similar configuration to that of the pixel output circuits 101. Because of this configuration, the photoelectric conversion devices of the present embodiment are adapted to fit change in signal value of the amplified reference signals to change in signal value of amplified pixel signals due to change in operational environment of the photoelectric conversion devices, such as the temperatures of the photoelectric conversion devices, the operation voltages, and noises from the outside of the photoelectric conversion devices.

It is to be noted that in the photoelectric conversion devices of the present embodiment, the signal processing circuits 200 output amplified signals of the inputted signals. As another example, it may be configured such that the signal processing circuits 200 each has a retainer for retaining inputted signals, and that the signals retained by the retainer are inputted to the output circuit 600.

In the photoelectric conversion devices of the present embodiment, the signal generation circuit 302 is provided separately from the pixel output circuits 101. As another example, it may be configured such that an amplified pixel signal is inputted to a node that is short-circuited between the input nodes of the output circuits 6000-1, 6000-2, and 6000-3. In this example also, the respective input nodes of the output circuits 6000-1, 6000-2, and 6000-3 are set at the same potential; therefore, the effects set forth in the present embodiment are achieved.

In the photoelectric conversion devices of the present embodiment, the transistors 1015 of the pixel output circuits 101 and the transistor 1015 of the signal generation circuit 302 may be configured to have the same channel width and the same channel length. This is for easier equalization of influences given to the pixel output circuits 101 and to the signal generation circuit 302 due to the operational environment of the photoelectric conversion devices.

Of the photoelectric conversion devices of the present embodiment, the respective transistors 1015 of the pixel output circuits 101 and the signal generation circuit 302 may be manufactured by the same process. This allows for still easier equalization of influences given to the pixel output circuits 101 and to the signal generation circuit 302 due to the operational environment of the photoelectric conversion devices.

In the present embodiment, an example is described in which the first amplifier and the second amplifier are source follower circuits. As another example, the first amplifier and the second amplifier may be differential amplifiers. In other words, the first amplifier and the second amplifier are the same circuit. For example, the pixel output circuits 101 and the signal generation circuit 302 may be different in number of switches that are provided to input signals to the first amplifier and to the second amplifier.

The signal generation circuit 302 may further have the pixel amplifier 1030. This is for easier matching of signal output characteristics between the pixel control circuit 102 and the signal generation circuit 302.

The first amplifier and the second amplifier may each have a plurality of source follower circuits, and the outputs of one source follower circuit thereof may be amplified by another source follower circuit for output.

In the photoelectric conversion devices of the present embodiment, one column of the signal processing circuit 200 may be provided for a plurality of columns of pixel output circuits 101.

It is to be noted that the photoelectric converters 1011 of the present embodiment may generate charge based on, for example, visible light, X-ray, and infrared light. Electromagnetic waves such as visible light, X-ray, and infrared light are also encompassed within the scope of the incident light herein.

Second Embodiment

A photoelectric conversion device according to a second embodiment is described primarily in connection with features different from the first embodiment.

Figure 3A:
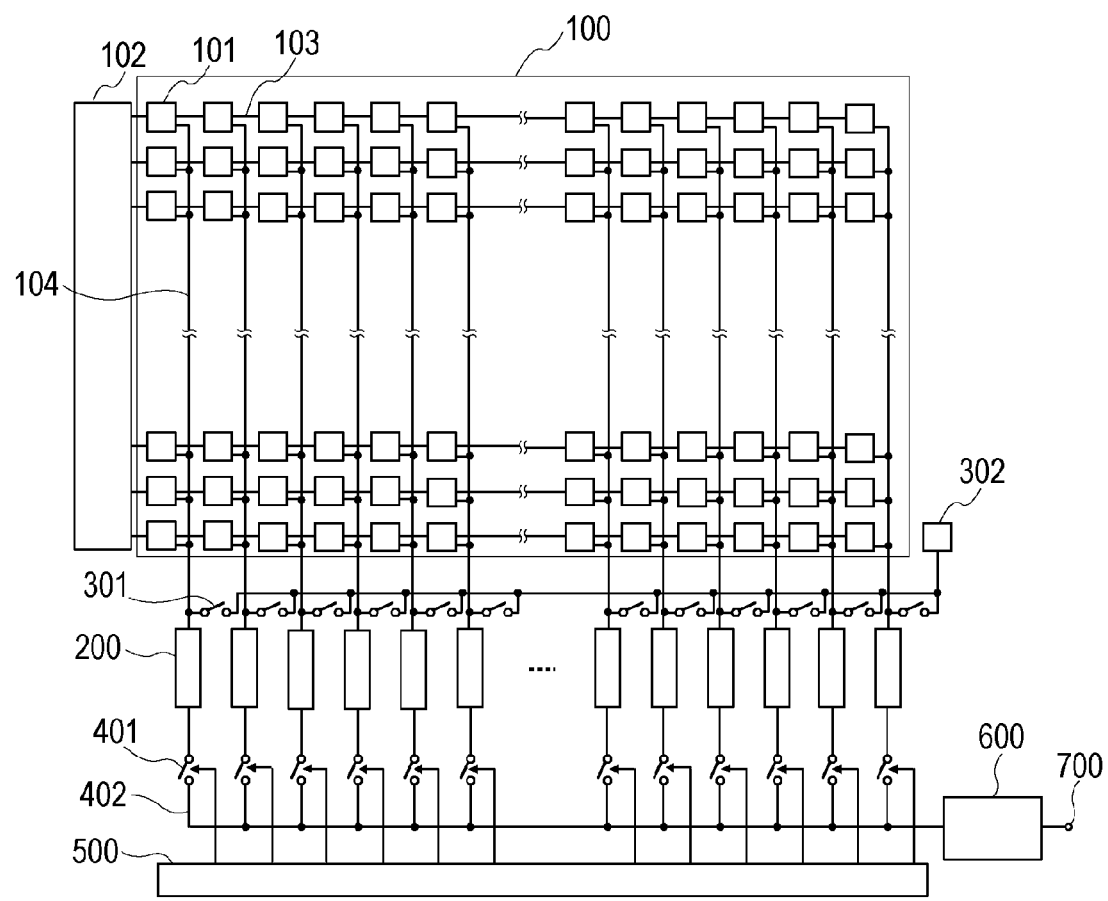
FIG. 3A is an exemplary configuration diagram of a photoelectric conversion device.

FIG. 3A depicts a photoelectric conversion device according to the present embodiment.

The switches 301 are connected to input nodes of the signal processing circuits 200. A timing generator turns on the switches 301 respectively connected to a plurality of columns of signal processing circuits 200. This brings the potential of the input nodes of the plurality of columns of signal processing circuits 200 to the potential of reference signals to be inputted from the signal generation circuit 302. In other words, the signal generation circuit 302 inputs common reference signals to the plurality of input nodes of the signal processing circuits 200. The signal processing circuits 200 generate amplified reference signals of the reference signals inputted from the signal generation circuit 302. Signals to be outputted from the pixel output circuits 101 based on charge generated by the photoelectric converters 1011 are indicated as "pixel signals." Signals to be generated by the signal processing circuits 200 by amplification of the pixel signals are indicated as "amplified pixel signals."

The horizontal selection circuit 500 transfers the amplified reference signals and the amplified pixel signals sequentially from each column of signal processing circuit 200 to the output circuit 600.

Figure 3B:
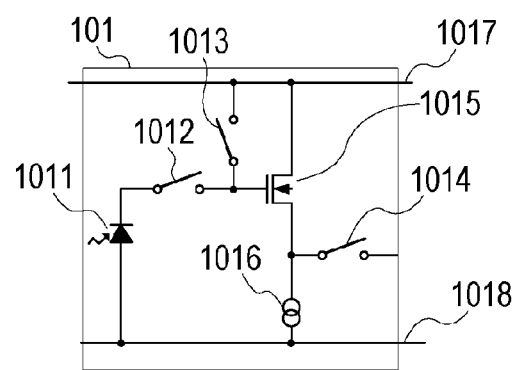
FIG. 3B is an exemplary configuration diagram of a pixel output circuit.

FIG. 3B depicts the pixel output circuit 101 of the present embodiment. In FIG. 3B, components with the same functions as the pixel output circuit 101 depicted in FIG. 1B are given the same reference numerals as those given in FIG. 1B. The pixel output circuit 101 of FIG. 3B is different from the pixel output circuit 101 depicted in FIG. 1B in non-presence of the pixel amplifier 1030. The pixel output circuit 101 of FIG. 1B inputs signals by way of the switches 1014-1, 1014-2, and 1014-3 into the three pixel output lines 104. In the pixel output circuit 101 of FIG. 3B, signals are inputted by way of one switch 1014 into one pixel output line 104.

Figure 4A:
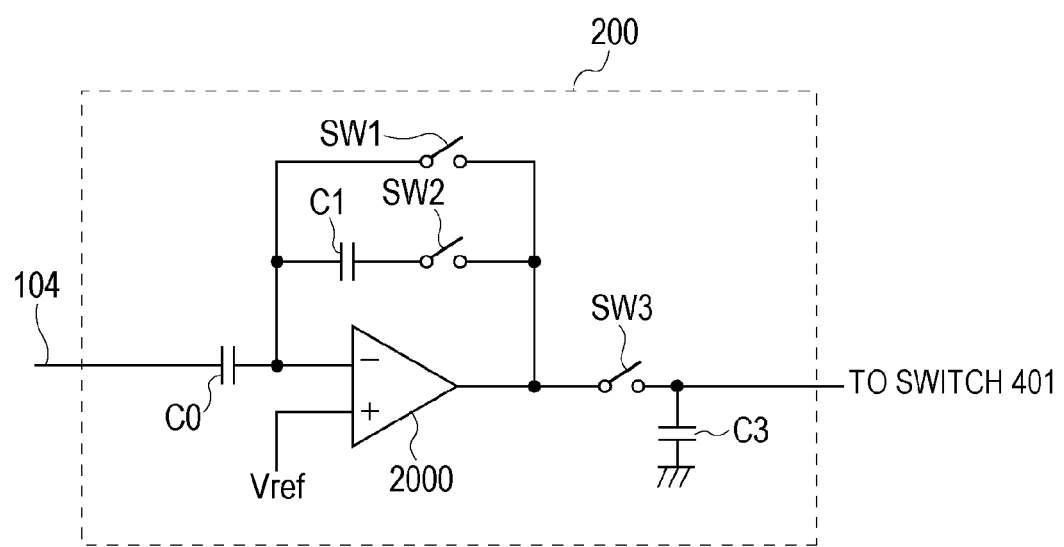
FIG. 4A is an exemplary configuration diagram of a signal processing circuit.

FIG. 4A depicts the signal processing circuit 200 of the present embodiment. The signal processing circuit 200 has capacitors C0, C1, and C3, switches SW1, SW2, and SW3, and an amplifier 2000. Signals inputted into the pixel output line 104 are inputted through the capacitor C0 to an inverting input node of the amplifier 2000. Reference voltage Vref is inputted to a non-inverting input node of the amplifier 2000. The capacitor C1 is provided on a feedback path of the amplifier 2000. When the timing generator turns on both the switches SW1 and SW2, signals of the capacitor C1 are reset. Signals outputted from the amplifier 2000 are inputted through the switch SW3 to the capacitor C3. The amplifier 2000 amplifies the pixel signals that are inputted to the inverting input node thereof and outputs the signals as amplified pixel signals. The amplifier 2000 amplifies the reference signals that are inputted to the inverting input node thereof and outputs the signals as amplified reference signals. The capacitor C3 and the switch 401 are electrically connected to each other.

The timing generator turns control signals φC to H level during a period from time t1 to time t4. The control signals φC being at H level causes common reference signals to be inputted to the signal processing circuit 200 in each column from the signal generation circuit 302. The signal processing circuit 200 in each column generates amplified reference signals based on the reference signals.

The horizontal selection circuit 500 sequentially turns control signals ϕH to H level during a period from time t2 to time t3, starting from the signal processing circuit 200 in the first column. This causes the amplified reference signals to be sequentially inputted from the signal processing circuit 200 in each column into the transfer line 402.

The timing generator turns control signals ϕC to L level at time t4.

The timing generator also turns signals VCLK to H level at time t4. This causes the pixel output circuits 101 in the first row to input pixel signals that are generated from incident light through photoelectric conversion into the pixel output line 104. The signal processing circuit 200 in each column generates amplified pixel signals that are generated by amplification of the pixel signals inputted from the pixel output line 104.

The horizontal selection circuit 500 sequentially turns the control signals ϕH to H level from time t5, starting from the signal processing circuit 200 in the first column. This causes the signal processing circuit 200 in each column to sequentially input amplified pixel signals into the transfer line 402.

In the photoelectric conversion devices of the present embodiment, each output circuit 600 outputs signals based on the amplified reference signals. The data processing circuit 900 retains the signals based on the amplified reference signals to be outputted from the respective output circuit 600 of the photoelectric conversion devices 1001. Then, signals of difference between the signals based on the amplified pixel signals and the signals based on the amplified reference signals, which are to be outputted from the same photoelectric conversion device 1001, are generated. In this manner, similar effects set forth in the first embodiment are achieved.

It is to be noted that in the photoelectric conversion devices of the present embodiment, the timing generator holds the control signals ϕC at H level during the period from time t1 to time t4. As another operational example, the timing generator may hold the control signals ϕC at H level during a period from time t1 to time t2 and at L level during a period from time t2 to time t4.

Third Embodiment

A photoelectric conversion device according to a third embodiment is described primarily in connection with features different from the second embodiment.

Figure 5A:
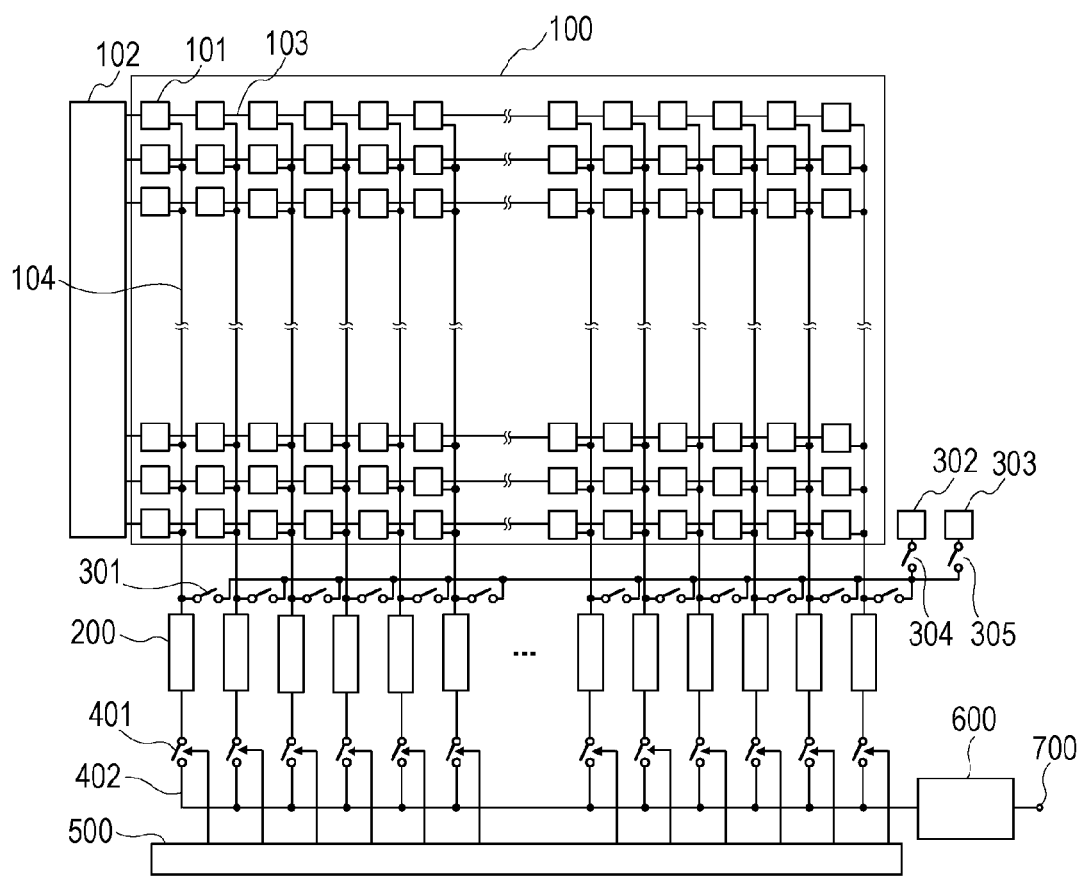
FIG. 5A is an exemplary operation diagram of a photoelectric conversion device.

FIG. 5A depicts a configuration of the photoelectric conversion device according to the present embodiment. The photoelectric conversion device of the present embodiment has a signal generation circuit 303, in addition to the signal generation circuit 302, as a circuit to input common reference signals to a plurality of columns of signal processing circuits 200.

Figure 5B:
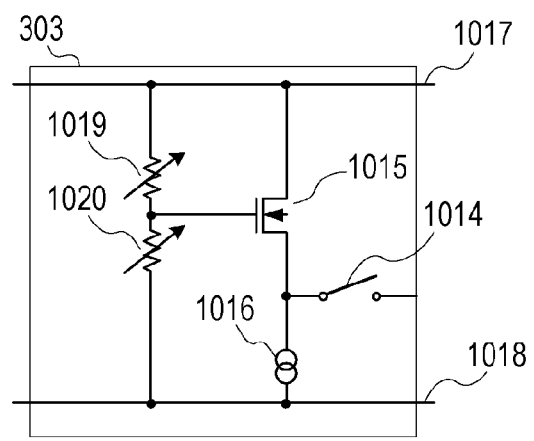
FIG. 5B is an exemplary configuration diagram of a signal generation circuit.

FIG. 5B depicts a configuration of the signal generation circuit 303 of the present embodiment. The difference from the signal generation circuit 302 depicted in FIG. 1C is its capability of inputting a potential different from the potential of the power source line 1017 to the input node of the transistor 1015.

The signal generation circuit 303 has resistors 1019 and 1020 with variable resistance values on the electrical path between the power source line 1017 and the ground line 1018. The input node of the transistor 1015 receives resistance values of the resistors 1019 and 1020 as well as potentials based on the potential of the power source line 1017 and based on the potential of the ground line 1018. The signal generation circuit 303 outputs reference signals of various signal values by means of changing the resistance values of the resistors 1019 and 1020. With this configuration, in the photoelectric conversion device of the present embodiment, reference signals of various signal values are inputtable to the input nodes of the signal processing circuits 200 besides signals at the reset level.

In the present embodiment, when a timing generator turns on a switch 304, reference signals outputted from the signal generation circuit 302 are inputted to a plurality of columns of signal processing circuits 200. Meanwhile, when the timing generator turns on a switch 305, reference signals outputted from the signal generation circuit 303 are inputted to the plurality of columns of signal processing circuits 200. The timing generator also turns on the switches 301 during a period in which the timing generator holds either switch 304 or 305 on. This brings the input nodes of the plurality of columns of signal processing circuits 200 to the same potential.

The photoelectric conversion device of the present embodiment may select either from the signal generation circuits 302 and 303 a circuit to input reference signals to the input nodes of the signal processing circuits 200. The signal generation circuit 302 inputs reference signals corresponding to signals at the reset level of the pixel output circuits 101 to the input nodes of the signal processing circuits 200. The signal processing circuits 200 each generates amplified reference signals based on the reference signals of the signal generation circuit 302. Then, the signal generation circuit 303 inputs to the input nodes of the signal processing circuits 200 reference signals of a signal value that is different from that of the reference signals outputted from the signal generation circuit 302. The signal processing circuits 200 generate amplified reference signals based on the reference signals of the signal generation circuit 303. The signal value of the amplified reference signals based on the reference signals to be outputted from the signal generation circuit 303 falls within the range of signal amplification that the amplified pixel signals can take. Thus, the amplified reference signals based on the reference signals of the signal generation circuit 303 enables gain correction with the signal processing circuits 200 within the range of signals that the amplified pixel signals can take. The gain correction is described. The signal generation circuit 303 outputs reference signals of a signal value A, and the signal processing circuits 200 have an amplification factor B. In this case, A×B is an ideal value for the signal value of the amplified reference signals to be generated by the signal processing circuits 200 based on the reference signals of the signal generation circuit 303. Meanwhile, where the actual signal value outputted from the signal processing circuits 200 is C, the output circuit 600 retains (A×B)/C as a gain correction factor. Then, the photoelectric conversion system uses the correction factor (A×B)/C to conduct correction on amplified pixel signals.

Alternatively, gain correction may be performed by using the reference signals to be outputted from the signal generation circuit 302 and the reference signals to be outputted from the signal generation circuit 303. Assume that the signals value of the reference signals to be outputted from the signal generation circuit 303 is X times as large as the reference signals to be outputted from the signal generation circuit 302. Further, assume that the ideal amplification factor of the signal processing circuits 200 is Y. In this case, the signal value of the amplified reference signals based on the signal generation circuit 303 is ideally X×Y times as large as the amplified reference signals based on the signal generation circuit 302. Calculation is performed based on the actual signals outputted from the signal processing circuits 200 to obtain a ratio of signal values of the amplified reference signals based on the signal generation circuit 303 to the amplified reference signals based on the signal generation circuit 302, as well as a deviation from X×Y times as a correction factor. This enables the output circuit 600 to perform gain correction. In addition, the signal generation circuit 303 may output reference signals of another different signal value, such that the output circuit 600 finds a correction factor by using a plurality of kinds of reference signals from the signal generation circuit 303 and the reference signals from the signal generation circuit 302.

In the present embodiment, description is given of the photoelectric conversion device having the signal generation circuit 303 in addition to the signal generation circuit 302. As another example, the photoelectric conversion device of the present embodiment may exemplarily have the signal generation circuit 303 and not the signal generation circuit 302.

Fourth Embodiment

A photoelectric conversion device according to a fourth embodiment is described primarily in connection with features different from the second embodiment.

In the present embodiment, signal generation circuits 302 are positioned within the pixel array 100, and the respective potentials of the power source lines 1017, the ground lines 1018, and a drive bias (not shown) are the same as the potential of the pixel output circuits 101.

Figure 6:
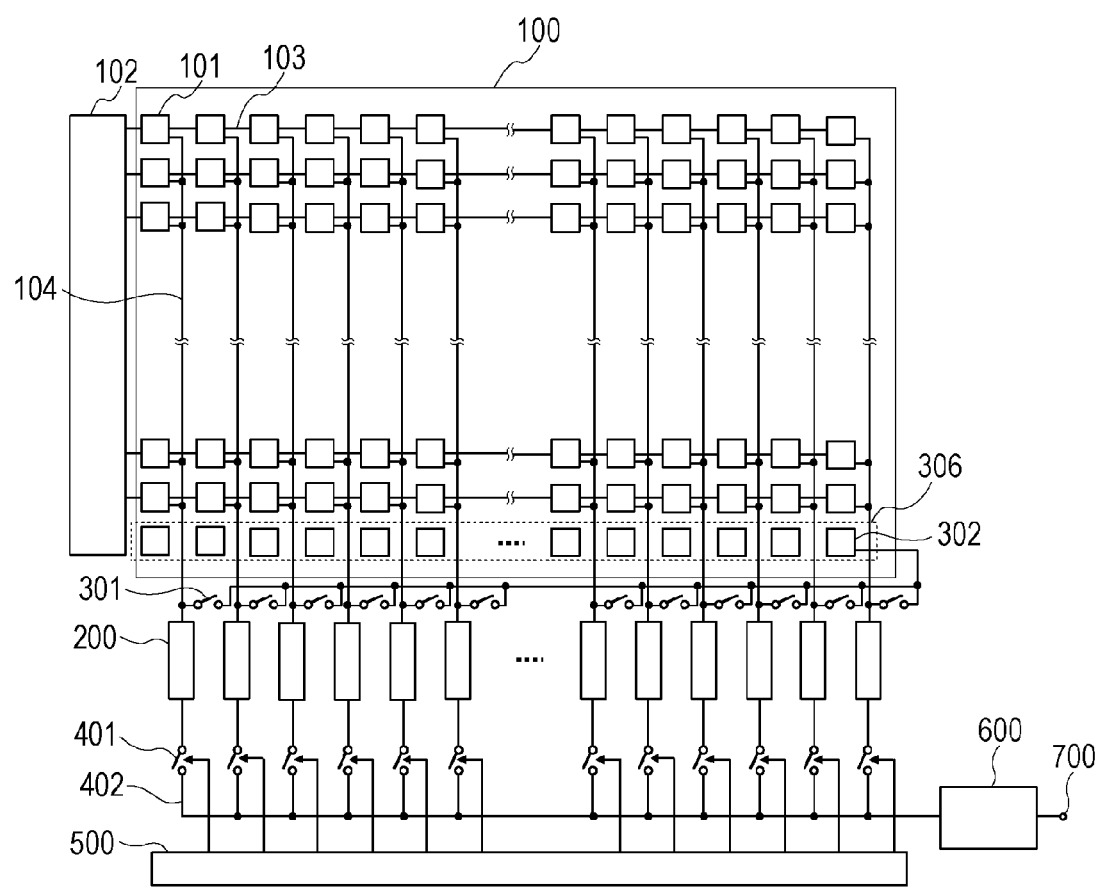
FIG. 6 is an exemplary configuration diagram of a photoelectric conversion device.

In the photoelectric conversion device depicted in FIG. 6, a signal generation circuit group 306 that has signal generation circuits 302 in the area corresponding to one row of the pixel array 100. The arrangement of the power source line 1017 and the ground line 1018 is the same between the pixel output circuits 101 and the signal generation circuits 302. More specifically, in the photoelectric conversion device depicted in FIG. 6, the signal generation circuits 302 are arranged in the pixel array 100, and the arrangement of the power source line 1017 and the ground line 1018 is the same between the signal generation circuits 302 and the pixel output circuits 101. This configuration allows for easy matching of operational environment for the signal generation circuits 302 and the pixel output circuits 101. The operational environment herein includes, for example, the respective potentials of the power source lines 1017 and the ground lines 1018, and the temperature of the photoelectric conversion device. It is to be noted that in the signal generation circuit group 306 depicted in FIG. 6, reference signals are outputted from the signal generation circuit 302 that is located the rightmost in the page space of FIG. 6. The other signal generation circuits 302 have the same configuration as that of the signal generation circuit 302 that is located the rightmost in the page space of FIG. 6 except that these circuits do not output reference signals. The photoelectric conversion device depicted in FIG. 6 may operate in the same manner as in the first embodiment.

The photoelectric conversion device of the present embodiment achieves easier matching of operational environment for the signal generation circuits 302 and the pixel output circuits 101 as compared to the photoelectric conversion device of the second embodiment.

Fifth Embodiment

A photoelectric conversion device according to a fifth embodiment is described primarily in connection with features different from the fourth embodiment.

Figure 7A:
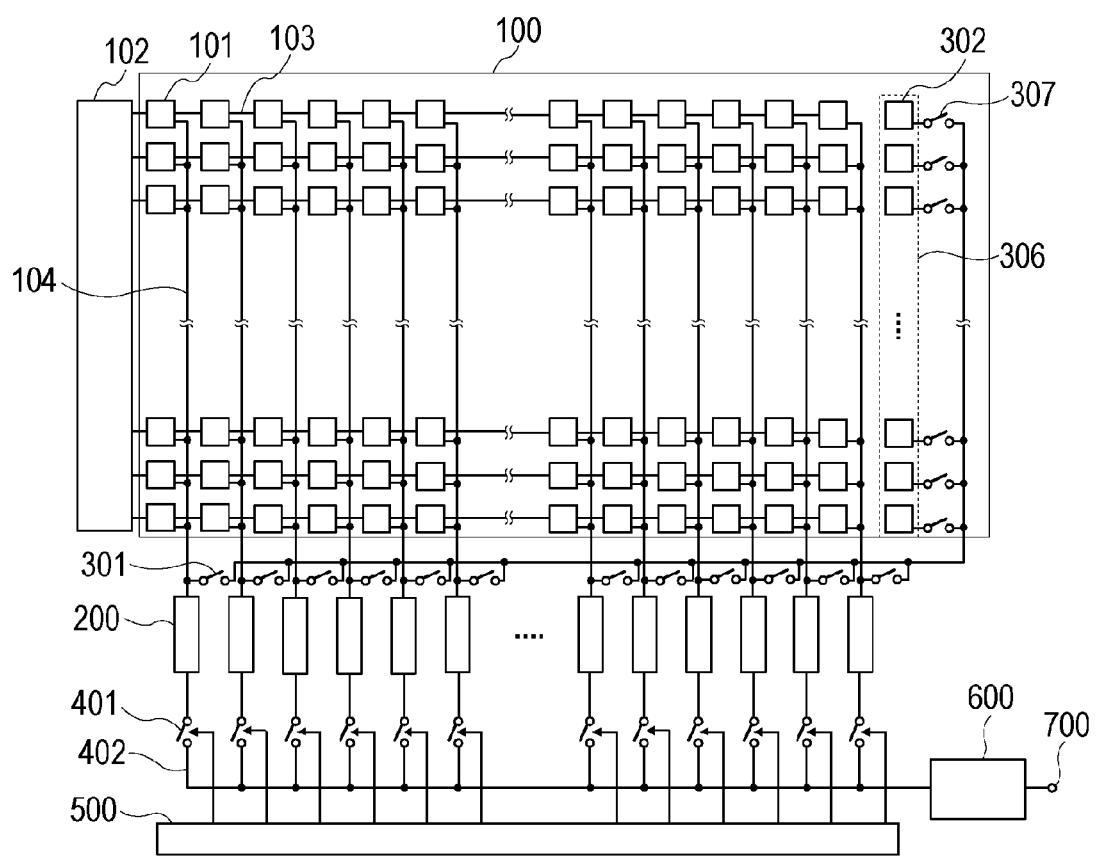
FIG. 7A is an exemplary configuration diagram of a photoelectric conversion device.

In the photoelectric conversion device depicted in FIG. 7A, the signal generation circuit group 306 is positioned in the area corresponding to one column of the pixel array 100. More specifically, the photoelectric conversion device depicted in FIG. 7A has the signal generation circuits 302 in each row of pixel output circuits 101. The photoelectric conversion device depicted in FIG. 7A has switches 307 on the electrical paths between the signal generation circuits 302 in each row and the input nodes of the signal processing circuits 200, respectively.

FIG. 7B is a timing diagram representing the operation of the photoelectric conversion device depicted in FIG. 7A. At time t1, a timing generator turns on the switch 307 for the signal generation circuit 302 in the first row. This causes the signal generation circuit 302 in the first row to input reference signals to the signal processing circuits 200 in a plurality of columns. The signal processing circuit 200 in each column generates amplified reference signals, and then the pixel output circuits 101 in the first row input pixel signals to the input node of the signal processing circuit 200 in each column. The signal processing circuit 200 in each column generates amplified pixel signals. Next, the timing generator turns on the switch 307 for the second row. This causes the signal generation circuit 302 in the second row to input reference signals to the signal processing circuits 200 in a plurality of columns. Subsequently, the pixel output circuits 101 in the second row input pixel signals to the input node of the signal processing circuit 200 in each column. Signal variation may occur in pixel signals per row of pixel output circuits 101. This signal variation occurs, for example, in a case where the potentials of the power source line 1017 and the ground line 1018 vary per row of pixel output circuits 101.

As another example, the timing generator may turn on the switches 307 for a plurality of rows simultaneously, so as for the signal generation circuits 302 in the plurality of rows to output reference signals simultaneously. In this case, the photoelectric conversion device may perform the operation described with reference to FIG. 4B.

Sixth Embodiment

A photoelectric conversion device according to a sixth embodiment is described primarily in connection with features different from the second embodiment.

Figure 8:
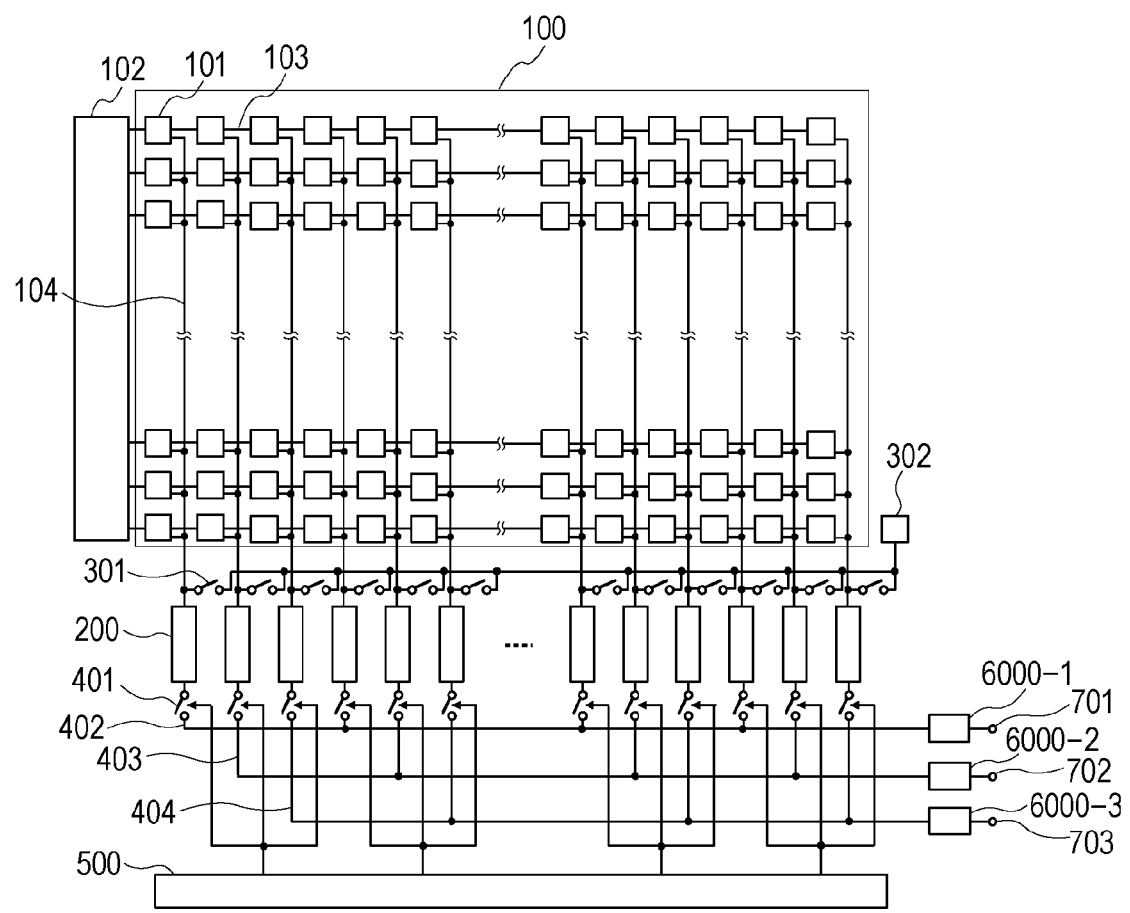
FIG. 8 is an exemplary configuration diagram of a photoelectric conversion device.

FIG. 8 depicts a photoelectric conversion device according to the present embodiment. The difference from the photoelectric conversion device depicted in FIGS. 3A and 3B is that the signal processing circuits 200 in three columns output in parallel signals generated by each signal processing circuit.

In the photoelectric conversion device depicted in FIG. 8, the horizontal selection circuit 500 turns on the switches 401 for three columns simultaneously. This causes the signal processing circuits 200 in the three columns input in parallel signals through the transfer lines 402, 403, and 404 to the output circuits 6000-1, 6000-2, and 6000-3, respectively. The output circuits 6000-1, 6000-2, and 6000-3 input arithmetically processed signals of the signals inputted thereto to the output nodes 701, 702, and 703, respectively.

The output circuits 6000-1, 6000-2, and 6000-3 have the same configuration as the output circuit 600 depicted in FIG. 3A.

Seventh Embodiment

A photoelectric conversion device according to a seventh embodiment is described primarily in connection with features different from the sixth embodiment.

Figure 9A:
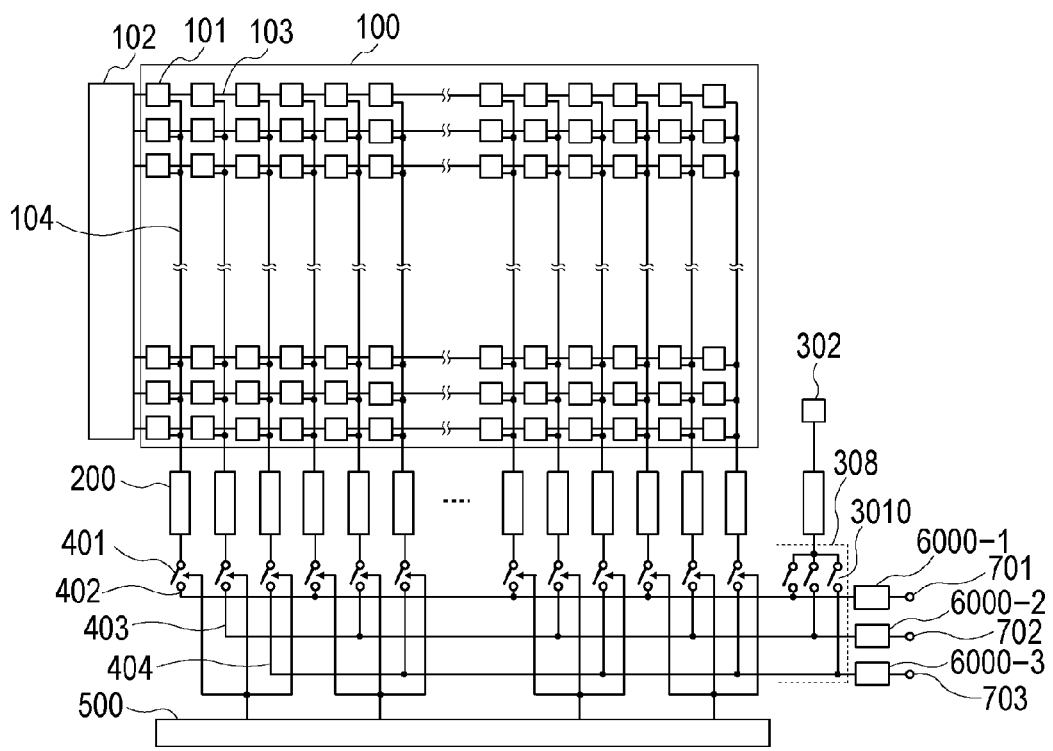
FIG. 9A is an exemplary configuration diagram of a photoelectric conversion device.

FIG. 9A depicts a photoelectric conversion device according to the present embodiment. The difference from the photoelectric conversion device depicted in FIG. 8 is that an amplified reference signal based on a reference signal is inputted to a node that is short-circuited between the input nodes of the parallelly arranged output circuits 6000-1, 6000-2, and 6000-3 by way of the switch group 308 comprising switches 3010.

FIG. 9B is a timing diagram representing the operation of the photoelectric conversion device depicted in FIG. 9A.

First, a timing generator turns control signals φC1 for controlling the switches 3010 to H level. This causes an amplified reference signal to be inputted to the node that is short-circuited between the input nodes of the output circuits 6000-1, 6000-2, and 6000-3.

As depicted in the timing diagram of FIG. 9C, the photoelectric conversion device depicted in FIG. 9A may also operate to obtain offset signals per row of pixel output circuits 101. Operation of the photoelectric conversion device as in FIG. 9C enables the output circuits 6000-1, 6000-2, and 6000-3 to generate signals in which effect of operational environment is removed from the amplified pixel signals, even though the operational environment changes during scanning of rows of pixel output circuits 101.

Eighth Embodiment

Figure 10:
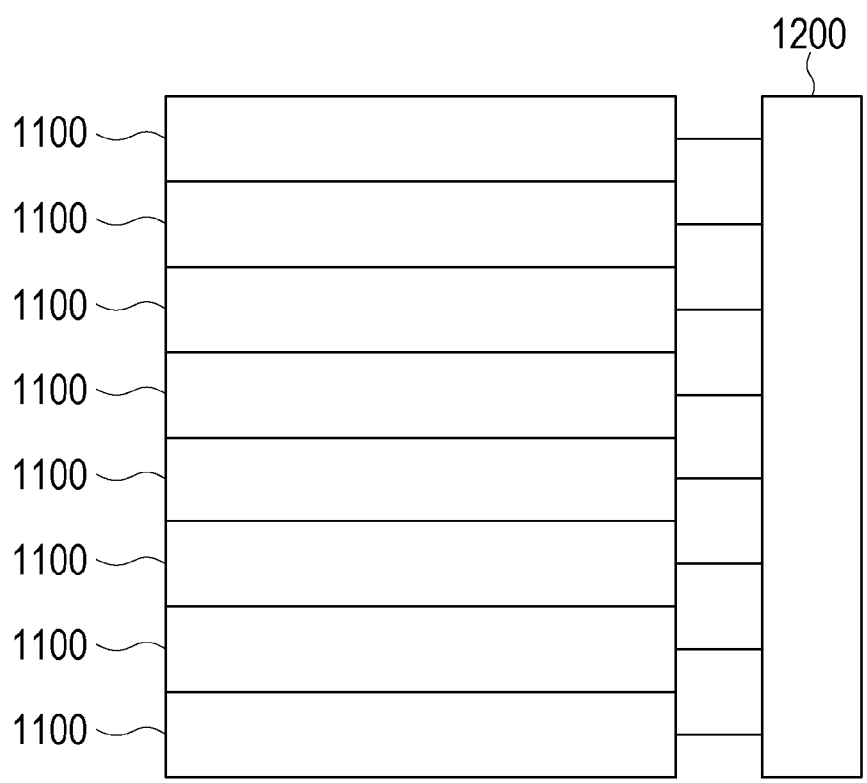
FIG. 10 is an exemplary configuration diagram of a photoelectric conversion system.

FIG. 10 depicts a photoelectric conversion system according to an eighth embodiment. The photoelectric conversion system according to the present embodiment has a plurality of photoelectric conversion systems 1100 depicted in FIG. 2A as unit photoelectric conversion systems. In the present embodiment, each unit photoelectric conversion system 1100 performs the operation illustrated in the timing diagram of FIG. 2B. In addition, the unit photoelectric conversion systems 1100 perform the operation illustrated in FIG. 2B in parallel to each other. The unit photoelectric conversion systems 1100 each outputs signals to a video output apparatus 1200. The video output apparatus 1200 generates images based on the image data to be outputted from each of the unit photoelectric conversion systems 1100.

Similar effects to those of the first embodiment are achieved in the photoelectric conversion system of the present embodiment.

According to the present disclosure, correction is implementable with difference in offset component in signals to be outputted per photoelectric conversion device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-141205, filed Jul. 5, 2013, which is hereby incorporated by reference herein in its entirety.

What is claimed is:

1. A photoelectric conversion system, comprising:
a plurality of photoelectric conversion devices; and
a data processing circuit configured to receive signals to be outputted from the photoelectric conversion devices, wherein
the photoelectric conversion devices are arranged on different semiconductor substrates, and
the photoelectric conversion devices each includes:
a pixel output circuit configured to output a first and second pixel signals having different in signal value;
a signal generation circuit configured to generate a reference signal;
a signal processing circuit configured to receive the first and second pixel signals, and process the first and second pixel signals;
a plurality of output circuits;
a first transfer line; and
a second transfer line,
the signal processing circuit being electrically connected through the first transfer line to an input node of a first output circuit of the output circuits,
the signal processing circuit being further electrically connected through the second transfer line to an input node of a second output circuit of the output circuits,
the input node of the first output circuit and the input node of the second output circuit being configured to receive a common signal based on the reference signal.

2. The photoelectric conversion system according to claim 1, wherein
the pixel output circuit includes a source follower circuit configured to output the pixel signal, and
the signal generation circuit has the same circuit configuration as the source follower circuit configured to output the pixel signal and configured to output the reference signal.

3. The photoelectric conversion system according to claim 2, wherein
the pixel output circuit and the signal generation circuit are configured to receive a common voltage,
the source follower circuit of the pixel output circuit includes a first transistor,
the source follower circuit of the signal generation circuit includes a second transistor, and
the pixel output circuit further includes a photoelectric converter and a third transistor, the photoelectric converter being configured to generate charge based on incident light,
the first transistor having:
a first input node configured to receive the charge;
a first primary node configured to receive the voltage; and
a second primary node configured to output the pixel signal based on a potential of the first input node,
the third transistor being a transistor configured to input a reset potential to the first input node,
the second transistor having:
a second input node configured to receive a signal corresponding to the reset potential;
a third primary node configured to receive the voltage; and
a fourth primary node configured to output the reference signal based on the signal corresponding to the reset potential.

4. The photoelectric conversion system according to claim 3, wherein
the photoelectric conversion devices each further includes a current source configured to input a current to the first transistor and to the second transistor, and
the second primary node and the fourth primary node are configured to receive a common voltage through the current source.

5. The photoelectric conversion system according to claim 4, wherein the first transistor and the second transistor are substantially the same in channel width and channel length.

6. The photoelectric conversion system according to claim 4, wherein the signal generation circuit is configured to output a reference signal different in signal value by change of a signal value of the signal to be inputted to the second input node.

7. The photoelectric conversion system according to claim 3, wherein the first transistor and the second transistor are substantially the same in channel width and channel length.

8. The photoelectric conversion system according to claim 7, wherein the signal generation circuit is configured to output a reference signal different in signal value by change of a signal value of the signal to be inputted to the second input node.

9. The photoelectric conversion system according to claim 3, wherein the signal generation circuit is configured to output the reference signal different in signal value by change of a signal value of the signal to be inputted to the second input node.

10. The photoelectric conversion system according to claim 1, wherein a node that is short-circuited between the input node of the first output circuit and the input node of the second output circuit is configured to receive the signal based on the reference signal.

11. The photoelectric conversion system according to claim 1, wherein
the data processing circuit includes a memory configured to retain the signal based on the reference signal to be outputted from each of the first output circuit and the second output circuit, and
the data processing circuit includes an operation circuit configured to generate a signal of difference between the signal retained by the memory and a signal based on the pixel signal.

12. The photoelectric conversion system according to claim 11, wherein
the data processing circuit includes a plurality of memories, and
the memories are configured to retain the signal based on the reference signal to be outputted from the first output circuit and the signal based on the reference signal to be outputted from second output circuit, respectively, of each of the photoelectric conversion devices.

13. The photoelectric conversion system according to claim 1, further comprising:
a plurality of pixel output circuits identical to the pixel output circuit, the pixel output circuits being arranged in a plurality of columns; and
a plurality of signal processing circuits identical to the signal processing circuit, the signal processing circuits being arranged in a plurality of columns, wherein
the columns of signal processing circuits correspond to the columns of pixel output circuits.

14. A photoelectric conversion system, comprising:
a plurality of photoelectric conversion devices; and
a data processing circuit configured to receive signals to be outputted from the photoelectric conversion devices, wherein
the photoelectric conversion devices are arranged on different semiconductor substrates, and
the photoelectric conversion devices each includes:
a plurality of pixel output circuits each configured to output a pixel signal;
a signal generation circuit configured to generate a reference signal;
a plurality of signal processing circuits each configured to process the pixel signal; and
a plurality of output circuits,
the pixel output circuits being arranged in a plurality of columns,
the signal processing circuits each being arranged correspondingly to the columns of pixel output circuits,
a first signal processing circuit being one of the plurality of signal processing circuits, and being configured to input a signal based on the pixel signal to an input node of a first output circuit of the output circuits,
a second signal processing circuit being the other one of the plurality of signal processing circuits, and being configured to input a signal based on the pixel signal to an input node of a second output circuit of the output circuits,
the input node of the first output circuit and the input node of the second output circuit being configured to receive a common signal based on the reference signal.

15. The photoelectric conversion system according to claim 14, wherein
the pixel output circuits each includes a source follower circuit configured to output the pixel signal, and
the signal generation circuit has the same circuit configuration as the source follower circuit configured to output the pixel signal and configured to output the reference signal.

16. The photoelectric conversion system according to claim 15, wherein
the pixel output circuits and the signal generation circuit are configured to receive a common voltage,
the source follower circuits of the pixel output circuits each includes a first transistor,
the source follower circuit of the signal generation circuit includes a second transistor, and
the pixel output circuits each further includes a photoelectric converter and a third transistor, the photoelectric converter being configured to generate charge based on incident light,
the first transistor having:
a first input node configured to receive the charge;
a first primary node configured to receive the voltage; and
a second primary node configured to output the pixel signal based on a potential of the first input node,
the third transistor being a transistor configured to input a reset potential to the first input node,
the second transistor having:
a second input node configured to receive a signal corresponding to the reset potential;
a third primary node configured to receive the voltage; and
a fourth primary node configured to output the reference signal based on the signal corresponding to the reset potential.

17. The photoelectric conversion system according to claim 16, wherein
the photoelectric conversion devices each further includes a current source configured to input a current to the first transistor and to the second transistor, and
the second primary node and the fourth primary node are configured to receive a common voltage through the current source.

18. The photoelectric conversion system according to claim 17, wherein the first transistor and the second transistor are substantially the same in channel width and channel length.

19. The photoelectric conversion system according to claim 17, wherein the signal generation circuit is configured to output a reference signal different in signal value by change of a signal value of the signal to be inputted to the second input node.

20. The photoelectric conversion system according to claim 16, wherein the first transistor and the second transistor are substantially the same in channel width and channel length.

21. The photoelectric conversion system according to claim 20, wherein the signal generation circuit is configured to output a reference signal different in signal value by change of a signal value of the signal to be inputted to the second input node.

22. The photoelectric conversion system according to claim 16, wherein the signal generation circuit is configured to output a reference signal different in signal value by change of a signal value of the signal to be inputted to the second input node.

23. The photoelectric conversion system according to claim 14, wherein a node that is short-circuited between the input node of the first output circuit and the input node of the second output circuit is configured to receive the signal based on the reference signal.

24. The photoelectric conversion system according to claim 14, wherein
the data processing circuit includes a memory configured to retain the signal based on the reference signal to be outputted from each of the first output circuit and the second output circuit, and
the data processing circuit includes an operation circuit configured to generate a signal of difference between the signal retained by the memory and the signal based on the pixel signal.

25. The photoelectric conversion system according to claim 24, wherein
the data processing circuit includes a plurality of memories, and
the memories are configured to retain the signal based on the reference signal to be outputted from the first output circuit and the signal based on the reference signal to be outputted from second output circuit, respectively, of each of the photoelectric conversion devices.

26. The photoelectric conversion system according to claim 14, wherein
the pixel output circuits are arranged in a plurality of columns, and
the signal processing circuits are each arranged correspondingly to the columns of pixel output circuits.

27. A photoelectric conversion system, comprising:
a plurality of photoelectric conversion devices; and
a data processing circuit configured to receive signals to be outputted from the photoelectric conversion devices, wherein
the photoelectric conversion devices are arranged on different semiconductor substrates, and
the photoelectric conversion devices each includes:
a plurality of pixel output circuits each configured to output a pixel signal;
a plurality of signal processing circuits each having an input node configured to receive the pixel signal, the signal processing circuits each being configured to process the pixel signal; and
a signal generation circuit configured to generate a reference signal,
the input node of each of the signal processing circuits being configured to receive a common signal based on the reference signal.

28. The photoelectric conversion system according to claim 27, wherein
the pixel output circuits each includes a source follower circuit configured to output the pixel signal, and
the signal generation circuit has the same circuit configuration as the source follower circuit configured to output the pixel signal and includes a source follower circuit configured to output the reference signal.

29. The photoelectric conversion system according to claim 28, wherein
the pixel output circuits and the signal generation circuit are configured to receive a common voltage,
the source follower circuits of the pixel output circuits each includes a first transistor,
the source follower circuit of the signal generation circuit includes a second transistor, and
the pixel output circuits each further includes a photoelectric converter and a third transistor, the photoelectric converter being configured to generate charge based on the incident light,
the first transistor having:
a first input node configured to receive the charge;
a first primary node configured to receive the voltage; and
a second primary node configured to output the pixel signal based on a potential of the first input node,
the third transistor being a transistor configured to input a reset potential to the first input node,
the second transistor having:
a second input node configured to receive a signal corresponding to the reset potential;
a third primary node configured to receive the voltage; and
a fourth primary node configured to output the reference signal based on the signal corresponding to the reset potential.

30. The photoelectric conversion system according to claim 29, wherein
the photoelectric conversion devices each further includes a current source configured to input a current to the first transistor and to the second transistor, and
the second primary node and the fourth primary node are configured to receive a common voltage through the current source.

31. The photoelectric conversion system according to claim 29, wherein the first transistor and the second transistor are substantially the same in channel width and channel length.

32. The photoelectric conversion system according to claim 29, wherein the signal generation circuit is configured to output the reference signal different in signal value by change of a signal value of the signal to be inputted to the second input node.

* * * * *